(No Model.) 2 Sheets—Sheet 1.

F. H. RICHARDS.
SPEED REDUCING DRIVING MECHANISM.

No. 553,317. Patented Jan. 21, 1896.

Witnesses:
J. L. Edwards Jr.
Fred. J. Dole.

Inventor:
F. H. Richards (No Model.) 2 Sheets—Sheet 2.

F. H. RICHARDS.
SPEED REDUCING DRIVING MECHANISM.

No. 553,317. Patented Jan. 21, 1896.

Witnesses:
J. L. Edwards Jr.
Fred J. Dole

Inventor:
F. H. Richards

UNITED STATES PATENT OFFICE.

FRANCIS H. RICHARDS, OF HARTFORD, CONNECTICUT, ASSIGNOR TO ALEXANDER B. COXE, OF DRIFTON, PENNSYLVANIA, AND HENRY B. COXE, OF NEW YORK, N. Y., EXECUTORS OF ECKLEY B. COXE, DECEASED.

SPEED-REDUCING DRIVING MECHANISM.

SPECIFICATION forming part of Letters Patent No. 553,317, dated January 21, 1896.

Application filed June 13, 1894. Serial No. 514,413. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Speed-Reducing Driving Mechanism, of which the following is a specification.

This invention relates to driving mechanism of the class in which differential gearing of the sun-and-planet type is employed for transmitting power from the driving wheel or shaft to the driven wheel or shaft for effecting a considerable reduction in the speed of said shaft relatively to the speed of the driving wheel or shaft.

The object of the present invention is to furnish a driving apparatus having two trains of speed-reducing gears, the fixed gears of which are carried by one of the respective members of a two-part casing, and the movable gears of which are carried by driving and driven shafts journaled, respectively, through such casing in such a manner that the movable gears may be assembled and disassembled at will entirely independently of the fixed gears and without disturbing the positions of such fixed gears relatively to the casing.

Figure 1:
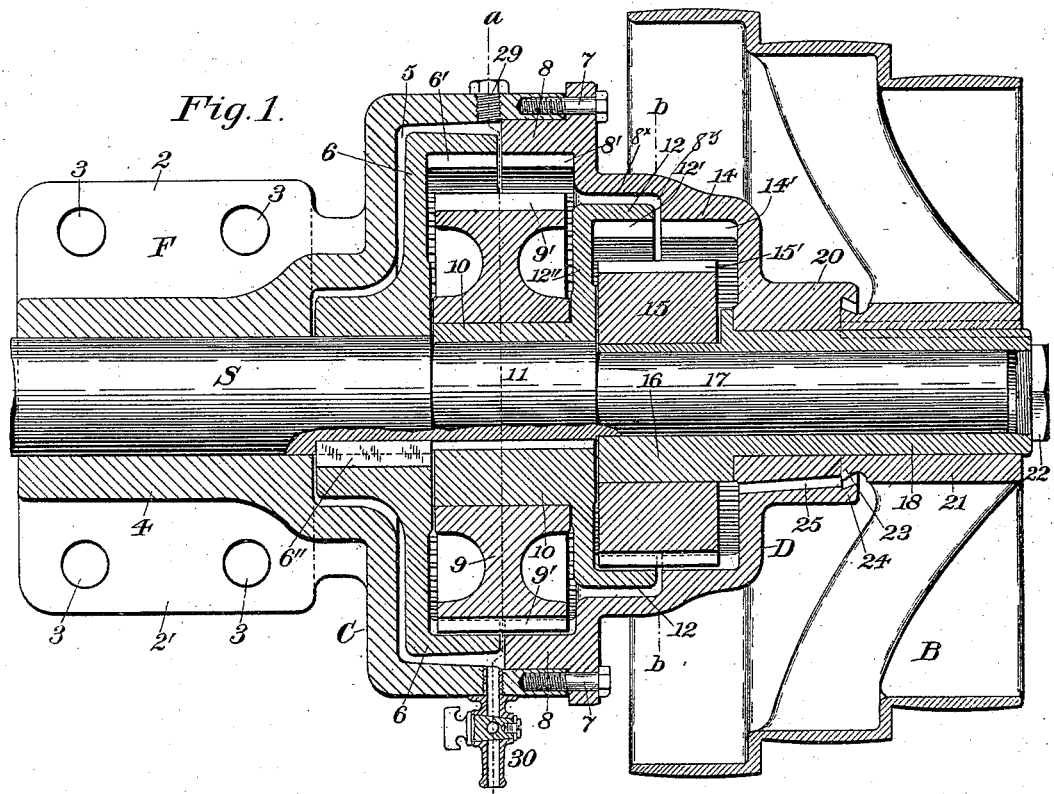
Figure 2:
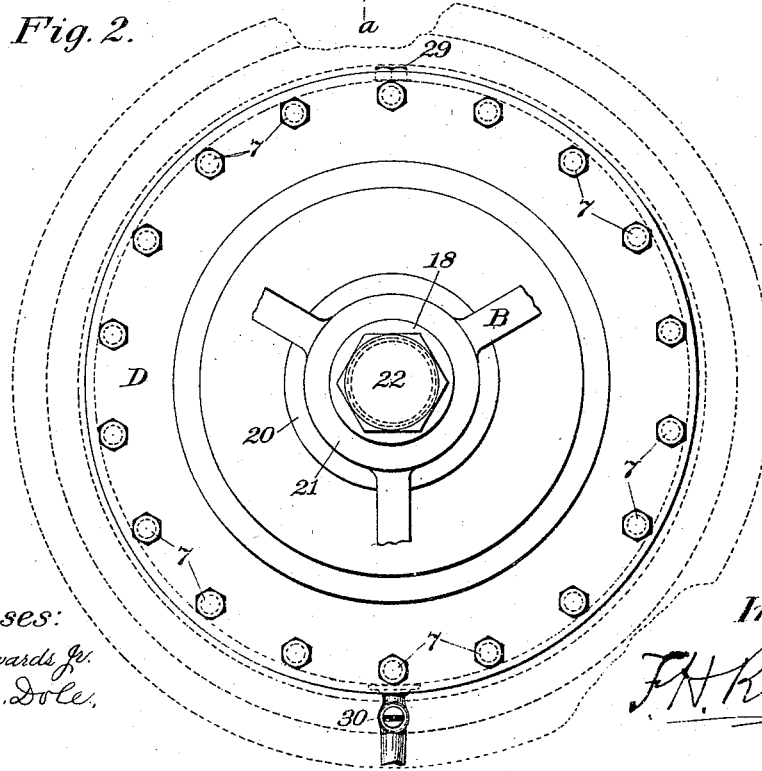
Figure 3:
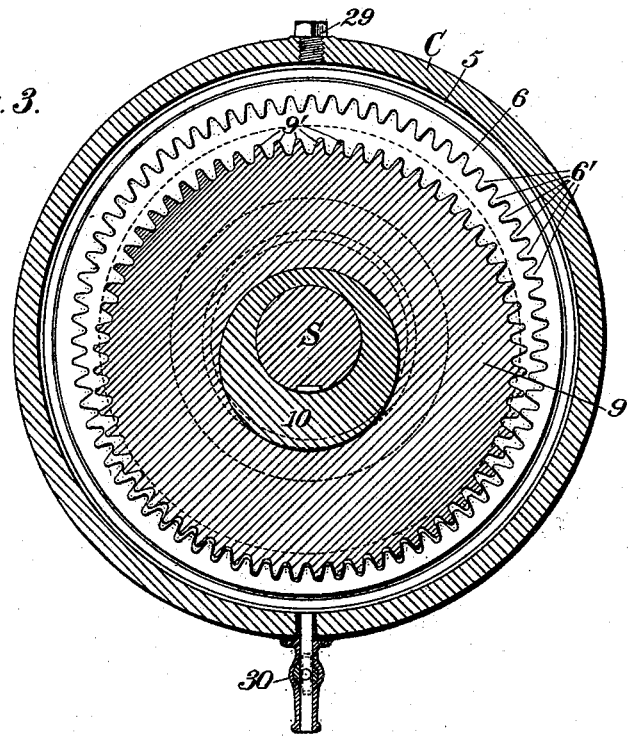
Figure 4:
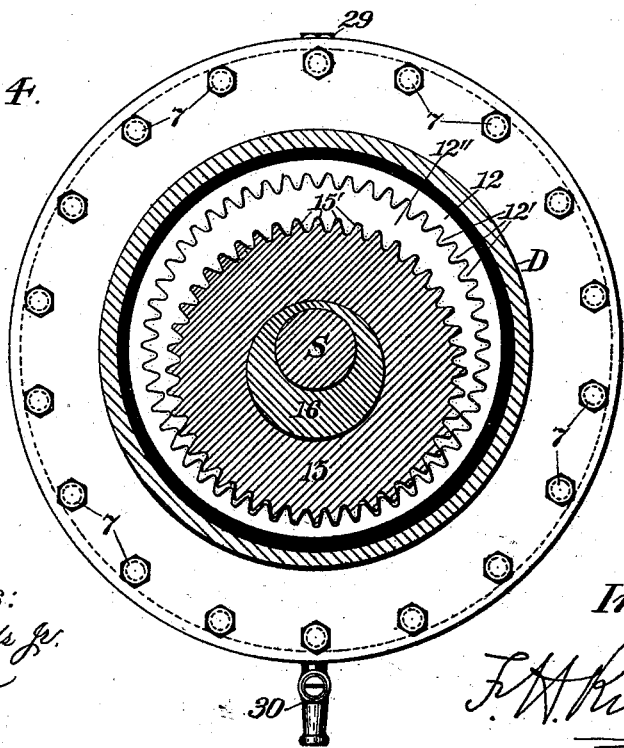

In the drawings accompanying and forming a part of this specification, Figure 1 is a sectional elevation of a speed-reducing driving gearing or apparatus embodying my present invention. Fig. 2 is an end elevation of the apparatus as seen from the right hand in Fig. 1, the driving-pulley B being broken away for more clearly showing the other parts of the apparatus. Fig. 3 is a sectional view in line *a a*, Fig. 1, through the second planet-wheel. Fig. 4 is a sectional view in line *b b* through the first planet-wheel.

Similar characters designate like parts in all the figures.

In the embodiment of my invention herein shown and described the speed-reducing mechanism comprises two differential trains of gearing, each having a fixed internal gear, a driven internal gear and an actuating planet-gear, and means in connection with the driven internal gear of one train for imparting an orbital movement to the planet-gear of the other train, whereby the ratio of speed reduction of one train will be multiplied by the ratio of that of the other train, as will be hereinafter more fully described.

Since in practice my improved speed-reducing driving mechanism will usually be applied to some machine having a shaft required to be operated at a slow speed and with considerable power, I have shown my apparatus carried by a principal bearing or frame, designated in a general way by F, and furnished with flanges 2 and 2', whereby it may be fixed, by means of bolts through the holes 3 in said flanges, to the framework or base of the machine to which the apparatus is to be applied. The main shaft S of the driving mechanism, also herein designated as the driven shaft, is shown journaled in a bearing 4 of the frame F, and will usually, in practice, be an extension of the shaft of the machine to be driven by, and to which my improved driving mechanism is applied.

In the organization herein shown the speed-reducing driving mechanism is carried upon the shaft S at one side of the bearing 4, said mechanism consisting of two coacting differential trains of gearing. Hereinafter designated the first and second trains, respectively. The second of these differential trains, which is adjacent to the bearings 4, comprises a driven internal gear 6, a fixed internal gear 8, and a planet-gear 9, and the first of these differential trains consists of a driven internal gear 12, carrying an eccentric 10 which engages and actuates the planet-gear 9 of the second differential train, a fixed internal gear 14, a planet-gear 15, an eccentric 16 engaging said planet-gear 15, and driving mechanism in connection with said eccentric, all of which will be hereinafter more fully described.

The frame F has beyond its journal-bearing 4 an extended casing C, forming a chamber 5, within which is contained the second driven wheel 6, which is rigidly fixed on said shaft adjacent to the bearing 4 by means of a spline or key 6''. A second casing D is secured to the outer edge of the casing C by means of screws 7. This casing is shown provided with a rim, which is in the nature of an internal gear having teeth 8', and which constitutes the fixed gear of the second differential train, the teeth 8' corresponding to the teeth 6' of the driven wheel 6, with the exception that the number of teeth in the internal gear 8 will be either less or greater by a difference of one or more than the number of teeth in the corresponding gear-wheel 6.

It will be seen that the plane faces of the fixed gears and the inner end walls of the two members of the casing form a series of internal annular stepped faces which position the movable gears and prevent longitudinal movement thereof.

A planet-wheel 9, of a lesser diameter than the gears 6 and 8, but of corresponding pitch and adapted for meshing with both of said gears, (after the manner of ordinary gearing and notwithstanding the difference in the number of teeth in the two wheels 6 and 8,) is mounted upon the second driving eccentric 10, which eccentric is mounted to revolve freely on the journal 11 of the shaft S, and has on one end thereof the disk 12'' of the first driven wheel 12, which, as herein shown, is preferably of a smaller diameter than the second driven gear 6, and also of a smaller external diameter than the inner diameter of the fixed gear 8. The casing D, adjacent to the wheel 12, has formed therein another fixed gear 14, whose teeth 14' correspond to the teeth 12' of the gear 12, with the exception that the set of teeth 14' are either less or greater in number, by one or more, than the set of teeth 12'.

Intervening the fixed gears 8' 14' in part D is a plain-faced step $8^x$, which serves as an annular chamber to receive the periphery of internal gear 12, a shoulder $8^y$ at the end of said chamber adjacent gear 14 preventing the endwise movement of gear 12 when the parts are assembled.

Another planet-wheel 15, similar to the planet-wheel 9 but smaller in size, has its teeth 15' adapted for meshing with both said teeth 12' and 14' after the manner, before referred to, of ordinary differential gearing. Said planet-wheel 15 is shown carried by an eccentric 16, which is mounted to revolve freely on the journal or portion 17 of the shaft S, the two planet-gears thus being carried revolubly upon independent centers. Said eccentric 16 has a tubular shaft 18, which is supported in the outer bearing 20 of the casing D. By this means the shaft S is directly supported at its outer end by the tubular shaft 18, and is also indirectly supported at that point by the bearing 20. The shaft 18 is extended outwardly through the bearing 20, and there carries a driving-pulley B, which, in the form thereof shown in Fig. 1 of the drawings, is a cone-pulley having three steps or belt-rims and secured to said shaft by its hub 21, suitably fixed to said shaft 18. The outer end of the tubular shaft 18 is shown closed by a plug or a screw 22 for preventing the escape of oil at that point. The inner end of the hub 21 is shown provided with a conical extension or rim 23, running within the reversely-formed rim or cup 24 of the bearing 20, which cup or rim is drained or emptied of oil through the conduit or passage-way 25 into the interior of the casing D. This feature is for the purpose of preventing any material loss of oil through the outer bearing. In this connection it should be understood that the casing D is intended to be fixed to the casing C with a close joint, so that a large amount of oil, in practice, several quarts in an apparatus of ordinary size, will be put into the casing for partially submerging the working mechanism contained therein.

A plug 29 is shown in the upper part of the casing C, by removal of which oil may be poured into the casing, and a stop-cock 30 is shown in the lower part of the casing, whereby to draw off the oil as occasion may require.

By means of the close casings the mechanism is thoroughly protected from dirt, and the oiling of the same is made positive, as set forth.

In operating the mechanism power is applied to the wheel B and is transmitted through the shaft 18 to the eccentric 16, which carries the planet-wheel 15, in an orbit of relatively-small diameter and in mesh with the fixed driving-gear 14 and the first driven gear 12. This operation, owing to the difference in the number of teeth, as before described, in the fixed gear 14 and first driven gear 12, results in revolving the gear 12 with a slow motion. In practice the driven gear 12 will ordinarily have one tooth either more or less than the fixed gear 14, so that each revolution of the eccentric 16 will turn forward or backward the gear 12 by the distance of one tooth thereof. Similarly, the revolution of the driven gear 12, transmitting the motion thereof through its eccentric 10 and the second planet-wheel 9, operates through fixed gear 8 to turn the second driven wheel 6 through a corresponding portion of its surface, and, since the wheel 6 is rigidly fixed to the shaft S, to revolve this shaft through the same portion of a circuit. In practice I usually make a difference of one tooth between the gears 12 and 14 and also make the same difference of one tooth between the gears 6 and 8. If now the number of teeth in the gears 12 and 14 be fifty and fifty-one, and the number of teeth in the gears 6 and 8 be seventy and seventy-one, it is evident that it will require fifty revolutions of the eccentric 16 to turn the gear 12 through one revolution, and it will also require seventy revolutions of the gear 12 and its eccentric 10 to turn the driving-wheel 6 through one revolution. Therefore, multiplying these results together, fifty times seventy gives a proportion of one to three thousand five hundred as the relative velocities of the shaft S and the wheel B, respectively.

This apparatus is especially applicable for driving the chain-wheel shafts of furnaces of the class described in Letters Patent of the United States No. 499,716, granted to Eckley B. Coxe June 20, 1893, in which furnaces the main driving-shaft (designated in said patent by 13) usually has a speed of only two or three revolutions per hour, whereas the shaft or motor from which the power is taken usually has a speed of one hundred revolutions per minute, or six thousand per hour. In this case the reduction rates of the gearing being one to three thousand five hundred, the pulley B will be belted to a driving-pulley on said motor-shaft of a ratio of one to seven-twelfths. This ratio will of course be varied as required in any particular instance; also, the ratio of the gearing itself can be varied within wide limits by properly changing the relative diameters of the several gears.

It will be observed that in my invention, in contradistinction to other constructions, all of the different gears are so disposed that by simply removing the screws 7 the detachable part D of the casing and all of the gearing, together with the shaft S, if desired, can be withdrawn bodily from the fixed part of the casing, thereby affording great facility for changing the gears—that is, substituting others having different numbers of teeth—and of cleaning the parts if gummed up with oil or impeded in operation by obstructions of any kind.

It will also be evident that when the movable cap or cover of bearing 4 is removed the shaft S can be retained in position and the movable part of the casing and all the connected gearing can be removed from the shaft, as it is of course obvious that gear 6, (keyed or splined to the shaft,) the eccentric 10, and tubular sleeve 18 can be readily slid along the same, if desired.

The removable part of the casing having the steps or shoulders integral therewith, two of which are provided with teeth 8' 14' and the other of which receives the gear 12, constitutes a feature of great importance in this class of machines. Owing to this device the machine can be made of fewer parts, is simplified and cheapened in construction, can be much more quickly assembled and disassembled, and is in all respects an improvement over the old type of machine, in which one only of the fixed gears is carried by the removable part of the casing, and the other is a detachable ring secured by screws to the fixed part of the casing and intervening two of the gears, thereby preventing the withdrawal of the parts either individually or collectively.

Having thus described my invention, I claim—

In a speed-reducing mechanism, the combination with a casing composed of two separable members, one of said members having a relatively-large fixed internal gear and a relatively-small fixed internal gear integral therewith; the smaller internal gear being disposed adjacent to one end of said casing-member, and the larger internal gear adjacent to the other end of the same casing-member; a tubular driving-shaft journaled in one of the casing-members and having an eccentric thereon; a planet-wheel mounted on said eccentric and co-operating with the relatively-small fixed internal gear; a driven-shaft journaled at one end in said tubular driving-shaft and also journaled in the other casing-member; a driven internal gear journaled on the driven-shaft and actuated by said planet-wheel and carrying an eccentric; a second planet-wheel mounted on the eccentric of said driven internal gear and co-operating with the relatively-large fixed internal gear adjacent to one end of the casing-member, and having a part of its periphery in one casing-member and a part thereof in the other casing-member; a second driven internal gear secured to the driven-shaft and actuated by said planet-wheel; the casing-member carrying the fixed internal gears having its internal wall adjacent to the first planet-wheel of smaller diameter than the diameter thereof adjacent to the second planet-wheel, and also having its internal wall adjacent to the first driven internal gear of smaller diameter than the diameter thereof adjacent to the second driven internal gear, and said casing having its members transversely separable between the internal driven-gears, whereby either said gearing or said gearing and the driven shaft can be removed bodily from the fixed member of the casing when the movable part of the casing is detached, substantially as and for the purpose specified.

FRANCIS H. RICHARDS.

Witnesses:
FRED. J. DOLE,
ROBT. RUDDELL.